UNITED STATES PATENT OFFICE.

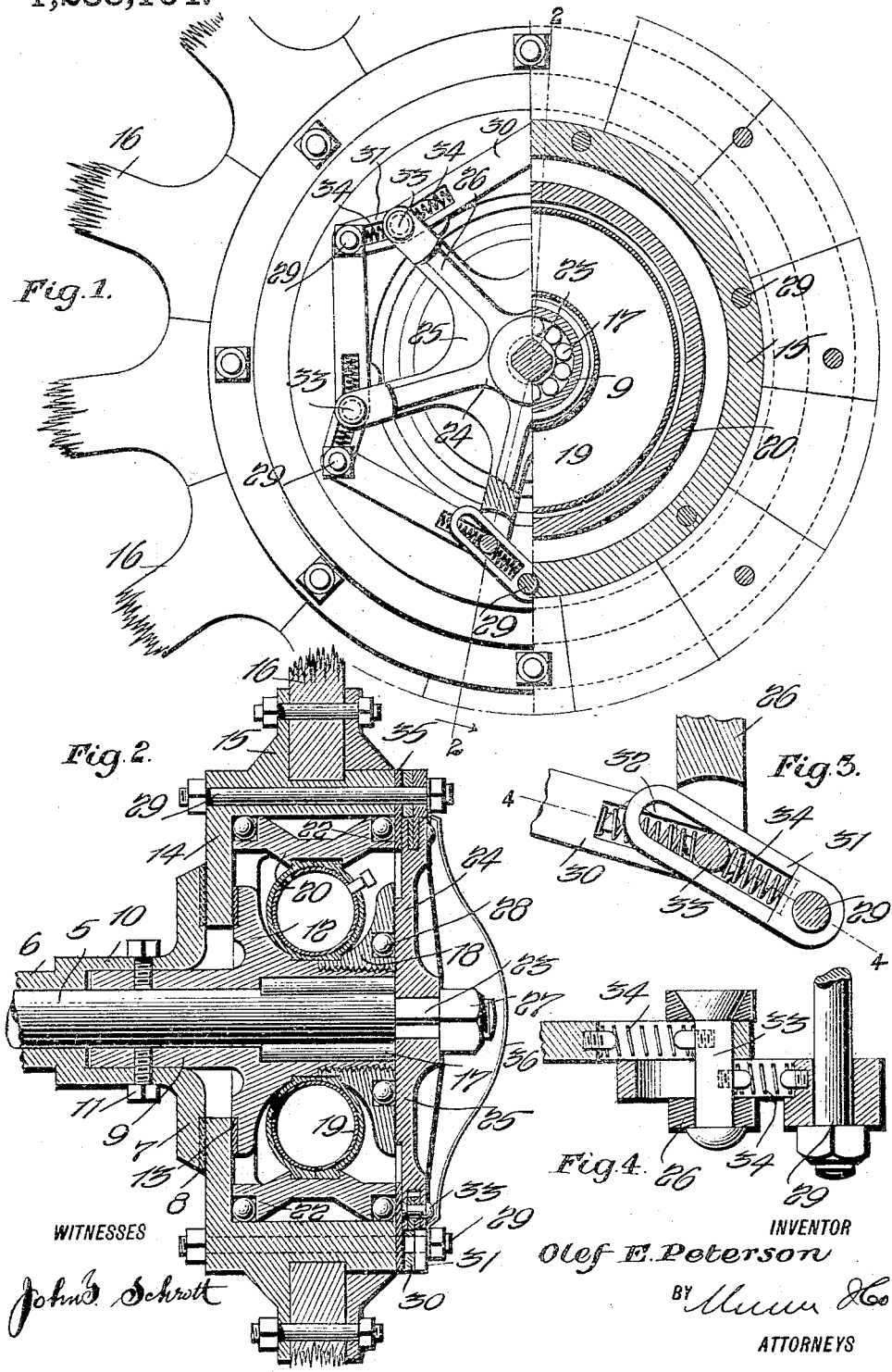

OLEF E. PETERSON, OF IDAHO FALLS, IDAHO, ASSIGNOR OF ONE-HALF TO CHARLES W. MULHALL, OF IDAHO FALLS, IDAHO.

RESILIENT WHEEL.

1,288,164.  Specification of Letters Patent.  Patented Dec. 17, 1918.

Application filed October 2, 1917. Serial No. 194,369.

*To all whom it may concern:*

Be it known that I, OLEF E. PETERSON, a citizen of the United States, and a resident of Idaho Falls, in the county of Bonneville and State of Idaho, have invented a certain new and useful Improvement in Resilient Wheels, of which the following is a specification.

This invention relates to an improvement in resilient wheels of the type in which an inner wheel rim is cushioned upon a pneumatic tube interposed between the inner wheel rim and the hub of the wheel.

One of the principal objects of the invention is to provide an improved means for acquiring a positive drive between the driving axle and the inner wheel rim.

Another object of the invention is to provide an improved means of mounting the wheel on the hub.

A further object resides in the provision of an improved and simplified hub construction.

Still a further object of my invention is to provide an improved resilient wheel of the class described, which will be characterized by advantages of simplicity, durability, efficiency in operation, and economy in manufacture and maintenance.

With these and other objects in view which will become apparent as the description proceeds, the invention resides in the construction, combination, and arrangement of parts hereinafter more fully described and claimed, and illustrated in the accompanying drawing in which like characters of reference indicate like parts throughout the several figures, of which—

Figure 1 represents a fragmentary view partially in elevation and partially in section, of a wheel constructed according to my invention;

Fig. 2 represents a sectional view on line 2—2 of Fig. 1, looking in the direction indicated by the arrow;

Fig. 3 represents a view partially in section and partially in elevation, showing the connection between the drive plate and the links or arms carried by the inner wheel rim;

Fig. 4 represents a sectional view on line 4—4 of Fig. 3.

Referring more particularly to the drawing, 5 represents one of the driven axle segments of the vehicle, and this segment rotates within the axle casing 6. This casing adjacent its outer end is provided with an outstanding flange 7 in one surface of which is countersunk an anti-friction ring 8. A sleeve 9 surrounds the outer end of the axle 5, and projects into the enlarged portion 10 of the axle casing 6, being secured in place and fixed with relation to the axle casing through the medium of suitable screws or bolts 11. The sleeve 9 is provided with an outstanding flange 12 which is arranged in spaced relation to the flange 7, and which has countersunk therein an anti-friction ring 13. Between the flanges 7 and 12 and bearing against the rings 8 and 13, occurs the annular flange 14 of the inner wheel rim 15. This wheel rim carries the spokes 16 of the wheel, and the flange 14 is preferably made integral with the inner rim. This flange is adapted to move in a radial plane between the flanges 7 and 12.

Interposed between the sleeve 9 and the axle 5 are the roller bearings 17 upon which the axle rotates relatively to the sleeve. The outer end portion of the sleeve is reduced and threaded, and threaded thereon is a ring 18 which coöperates with the flange 12 in seating a pneumatic tire, indicated generally at 19. Against the periphery of this tire bears the ring 20, and relatively to this ring the inner rim 15 of the wheel is adapted to rotate. Bearing balls 21 are arranged in races 22 provided at the edges of the floating ring 20, such bearing balls being interposed between the floating ring and the inner wheel rim 15. The pneumatic tire 19 around its inner and outer circumferences may be provided with tongue portions as shown, engaging in corresponding grooves or channels in the sleeve 9, and floating ring 20, for preventing accidental transverse displacement of the pneumatic tire relative to these parts.

On the outer squared end portion 23 of the axle segment 5 is fitted a drive plate indicated generally at 24, which plate includes a central web portion 25 and a plurality of radiating arms 26. The drive plate is secured in position on the axle segment through the medium of a suitable nut 27, and interposed between the drive plate and the ring 18 is a series of antifriction thrust bearings 28 which facilitate rotary movement of the drive plate relatively to the ring.

Extending through the inner rim transversely thereof and at spaced intervals, is a plurality of bolts 29, and between adjacent bolts project the outer ends of the arms 26. Each of these arms is connected to adjacent bolts through the medium of longer and shorter links 30 and 31 respectively. The outer ends of these links are pivotally mounted on their respective bolts, and the inner ends of the links overlap and are longitudinally slotted as at 32 and are engaged over pins 33 carried at the outer bifurcated ends of the arms 26, the pin in each instance extending through the slotted portion 32 of the overlapping link ends. The outer ends of the arms 26 are bifurcated, to form prongs between which the inner overlapped ends of the links are held. It is through the medium of these links that the power is transmitted from the drive plate 24 to the inner wheel rim 15 for rotating the latter. The links connected with each of the arms 26, converge somewhat in the general direction of the center of the hub, as indicated plainly in Fig. 1, thereby to facilitate radial movement of the inner rim relatively to the drive plate. The slotted inner ends of the links overlap a sufficient distance to allow free oscillation of the drive plate relatively to the inner rim. The pins 33 are held against rattling or loose movement through the operation of coiled springs 34 interposed, on opposite sides of the pins, between these pins and the outer ends of the slots formed in the links.

As shown in Fig. 2, an anti-friction ring 35 is secured by means of the bolts 29 to the outer edge of the inner rim 15, and laps at its inner margin over the outer edge of the floating ring 22, being interposed between this floating ring and the outer ends of the arms 26 of the drive plate. A suitable circular guard 36 as shown in Fig. 2, is secured at its marginal portions on the bolts 29, and this guard serves to prevent entrance of dirt or dust to the working parts of the hub.

From the foregoing description, the operation of the device will be clearly apparent. It may be stated, however, that the drive from the axle segment 5 is delivered to the drive plate 24, this plate of course rotating with the axle segment, and in turn transmitting rotary motion through the operation of links 30 to the inner rim of the wheel. The arrangement of the links, as will be understood, provides for a positive drive of the wheel rim in either direction. At the same time that rotary motion is imparted to the inner rim, the latter is free to move in radial directions relatively to the drive plate and relatively to the non-rotating parts of the hub.

Although I have described what I now believe to be the preferred embodiment of my invention, I may desire to make such changes in the construction, combination, and arrangement of parts thereof, as do not depart from the spirit of the invention and the scope of the appended claims.

I claim:

1. The combination with a driven axle segment and a casing relatively to which the segment rotates, of a sleeve mounted on the axle segment and having a portion fixed to the axle casing, relatively to which sleeve the axle segment rotates, an inner wheel rim having a flange portion slidably engaging between the axle casing and the said sleeve, a floating ring arranged within and concentric to the inner rim relatively to which ring the inner rim is adapted to rotate, a resilient tire interposed between the floating ring and the said sleeve, and means for imparting a rotary motion to the inner rim from the axle segment.

2. The combination with a driven axle, of a casing in which the axle rotates, said casing having an enlarged portion terminating in a flange, a sleeve secured in the enlarged portion of the casing and in which the axle rotates, the sleeve having a flange spaced from the flange of the casing, an inner rim surrounding the sleeve and having a flange projecting into the space between the flanges of the sleeve and casing, a floating ring between the rim and sleeve, a resilient tire between the ring and sleeve, and means for rotating the rim from the axle.

3. The combination with a driven axle segment, of a sleeve relatively to which the segment rotates, an inner rim rotatably surrounding the sleeve, means resiliently spacing the inner rim from the sleeve, a drive plate fixed on the axle segment for rotation therewith, and including a plurality of radiating arms, a plurality of bolts fixed in spaced relation to each other on the inner rim, a plurality of pairs of links pivotally mounted at their outer ends on the said bolts, the members of each pair overlapping at their inner ends and being provided with longitudinal slots, a pin mounted on each of the arms of the said drive plate, each of the pins projecting through the slots formed in one pair of links, and springs interposed on opposite sides of each pin between the said pin and the outer ends of the slots formed in the links.

4. In combination, a driven axle segment, an inner rim surrounding the axle segment, and movable radially relatively thereto, means resiliently supporting the inner rim relatively to the axle segment, a plurality of pairs of links pivotally mounted on the inner rim, the members of each pair converging toward the center of the rim and having overlapping inner ends provided with longitudinal slots, a drive plate fixed for rotation with the axle segment and having radiating arms, pins carried by the arms and extending through the slots formed in the pairs of links, and resilient means interposed between the pins and the outer ends of the slots formed in the links.

5. In combination, a hub, a driven axle segment, an inner rim mounted for oscillation relatively to the axle segment, resilient means between the hub and rim, a plurality of pairs of links pivotally mounted on the inner rim, said pairs including members having overlapping inner ends, a driven plate carried by the axle segment for movement therewith, and including a plurality of radiating arms, pin and slot connections between the radiating arms and the overlapping inner ends of the pairs of links, and anti-rattling means between the arms and the links.

6. In combination, a hub, a driven axle segment, an inner rim mounted for radial movement relatively to the axle segment, resilient means between the hub and rim, a drive plate carried on the axle segment for movement therewith, a plurality of pairs of links pivotally mounted on the inner rim and having overlapping inner ends, and pin and slot connections between the drive plate and the overlapping ends of the links.

7. In a wheel, a hub, a rotatable axle in the hub, a rim mounted to rotate around the hub, a plurality of radiating arms secured to the axle to rotate therewith, pairs of links secured to the rim, and means for pivotally connecting the links of each pair of links together and with an arm.

8. In a wheel, a hub, a rotatable axle mounted in the hub, rim mounted to rotate about the hub, a plurality of pairs of overlapping and slotted links carried by the rim, a plurality of radial arms carried by the axle and each having a pin extending through the slots of a pair of links, and springs in the slots of the links on opposite sides of the pin of each arm.

OLEF E. PETERSON.

Witnesses:
B. A. ROBINSON,
FRED GUSTAFSON.